(12) United States Patent
Costes

(10) Patent No.: US 7,031,059 B1
(45) Date of Patent: Apr. 18, 2006

(54) DEVICE FOR ACQUIRING STEREOSCOPIC IMAGES

(75) Inventor: Vincent Costes, Montrabe (FR)

(73) Assignee: Centre National d'Etudes Spatiales, Paris (FR)

( * ) Notice: Subject to any disclaimer, the term of this patent is extended or adjusted under 35 U.S.C. 154(b) by 25 days.

(21) Appl. No.: 10/070,564

(22) PCT Filed: Sep. 8, 2000

(86) PCT No.: PCT/FR00/02486

§ 371 (c)(1), (2), (4) Date: Jul. 30, 2002

(87) PCT Pub. No.: WO01/20385

PCT Pub. Date: Mar. 22, 2001

(30) Foreign Application Priority Data

Sep. 10, 1999 (FR) .................................. 99 11355

(51) Int. Cl.
*G02B 27/22* (2006.01)
*G02B 17/00* (2006.01)

(52) U.S. Cl. ..................... 359/464; 359/462; 359/366; 359/363

(58) Field of Classification Search ................ 359/462, 359/364, 365, 366, 378, 850, 851, 464, 363; 250/452, 206
See application file for complete search history.

(56) References Cited

U.S. PATENT DOCUMENTS

| 3,781,552 | A | * | 12/1973 | Kadrmas | ............. 250/214 DC |
| 4,101,195 | A | * | 7/1978 | Frosch et al. | ................ 359/366 |
| 5,661,610 | A |   | 8/1997 | Pasternak | ................... 359/859 |
| 6,050,194 | A | * | 4/2000 | Bugiel et al. | ............... 102/211 |

FOREIGN PATENT DOCUMENTS

| DE | 43 07 831 A1 | 8/1993 |
| EP | 0 655 636 A1 | 5/1995 |
| FR | 1 393 577 | 7/1965 |
| GB | 2 158 261 A | 11/1985 |

OTHER PUBLICATIONS

International Search Report, Nov. 21, 2000.

* cited by examiner

*Primary Examiner*—Audrey Chang
(74) *Attorney, Agent, or Firm*—Morgan & Finnegan, LLP

(57) ABSTRACT

The invention concerns a device for acquiring stereoscopic images comprising a primary mirror (1) or a near-parabolic mirror, a secondary mirror (2) located on the primary mirror optical axis between said primary mirror and its focal point, tertiary reflecting means (4a, 4b, 5a, 5b, 7a, 7b, 8) arranged relative to the primary mirror on the side opposite the secondary mirror reflecting along two directions different from that of the primary mirror optical axis the optical beams received by the primary mirror along two specific directions of incidence, the primary mirror being capable of being traversed by the tertiary beams, said tertiary reflecting means comprising means for focusing the optical beams which they receive along said two directions onto image acquisition means.

5 Claims, 3 Drawing Sheets

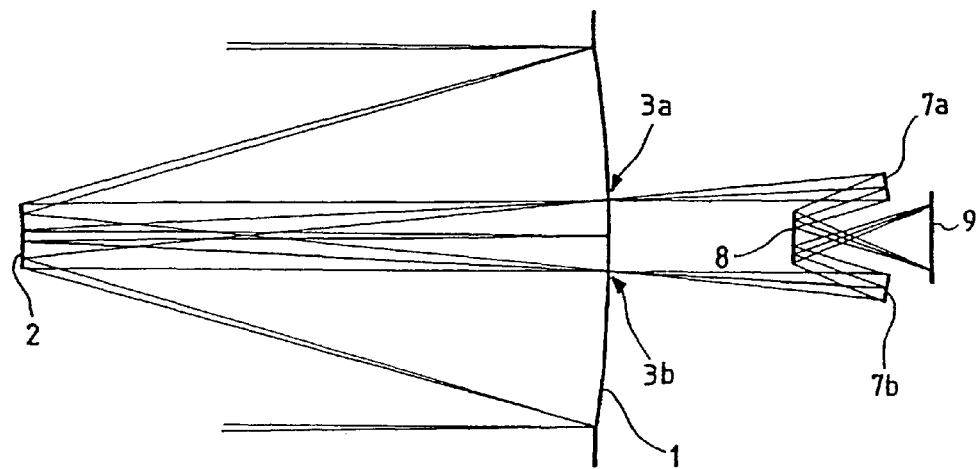
FIG_3
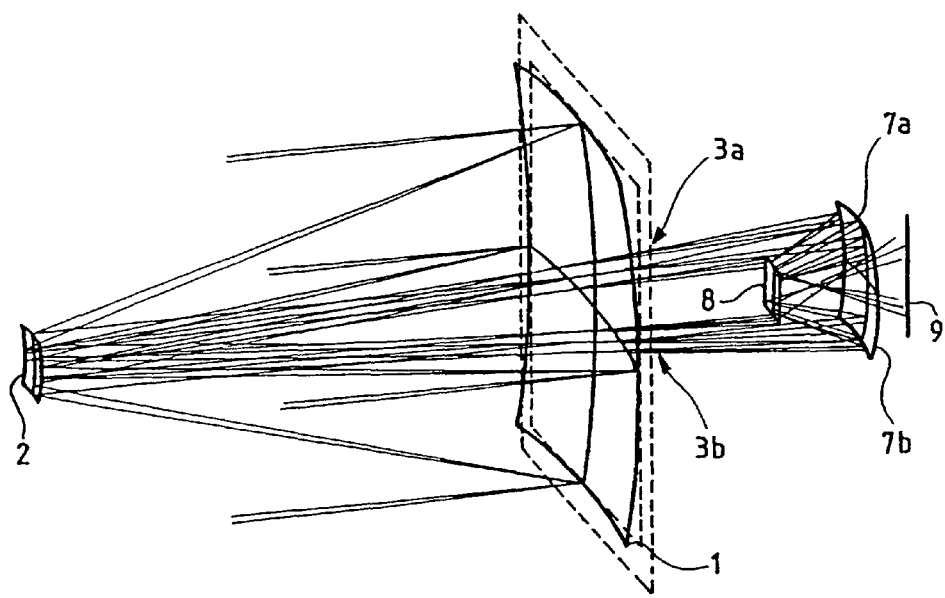
FIG_4

DEVICE FOR ACQUIRING STEREOSCOPIC IMAGES

The present invention relates to a device for acquiring stereoscopic images.

It is recalled that stereoscopic images are obtained by viewing the same scene from two different angles of incidence.

An object of the invention is to propose a device for acquiring stereoscopic images that is particularly simple, compact, and adapted to very good angular resolution.

Document FR 1 393 577 describes a collimator device for infrared radiation. That device comprises:
- a parabolic primary mirror;
- a hyperbolic secondary mirror positioned between the primary mirror M1 and its focus;
- an elliptical tertiary mirror disposed relative to the primary mirror on its side opposite from its side on which the secondary mirror is disposed; and
- a detector positioned at the focus of the tertiary mirror.

Such a device serves to concentrate a light beam received by the primary mirror parallel to its optical axis onto the detector.

DE 4 307 831 discloses binocular telescopic structures making it possible to observe remote scenes and comprising:
- a parabolic mirror;
- secondary mirrors situated on either side of the optical axis of the primary mirror, between said primary mirror and its focal plane; and
- tertiary reflection means disposed relative to the primary mirror on its side opposite from the side on which the secondary mirror is disposed, and in which the primary mirror is adapted to pass the light beams reflected by the secondary mirrors so as to enable them to reach the tertiary reflection means.

Document UK 2 158 261 describes a similar optical device, comprising a concave spherical primary mirror, a convex spherical secondary mirror positioned on the optical axis of the primary mirror, the primary mirror being suitable for passing the light beams reflected by the secondary mirror so as to enable them to reach a catadioptric lens. Such a device enables an incident beam parallel to the optical axis to be split into two beams, these two beams corresponding respectively to the portions of the beam that pass on either side of two secondary half-mirrors.

Document EP 0 655 636 describes an aiming eyepiece device having an inlet pupil, a primary mirror, a secondary mirror, and a refractive lens. The elements are disposed in such a manner as to transmit an image of the refractive lens towards the inlet pupil.

Such a telescope is intended for observing objects that are very far away (an application to astronomy, for example) and is not suitable in any way for acquiring stereoscopic images.

The invention proposes an optical device which makes it possible to observe the same scene with different angles of incidence.

In particular, the device proposed by the invention is advantageously applicable in acquiring a stereoscopic image by means of a satellite moving over the earth and observing the same scene at two different instants, and thus at two different angles.

Thus, the device proposed by the invention is an observation device according to claim 1.

The invention advantageously also has the various following characteristics, taken singly or in any technically feasible combination:

- the two directions of incidence that it observes are symmetrical about the optical axis, and the light beams which reach the primary mirror along said two directions of incidence are reflected by the secondary mirror symmetrically about the optical axis;

- the tertiary reflection means comprise two plane mirrors placed symmetrically on either side of the direction of the optical axis of the primary mirror, together with two concave mirrors also disposed symmetrically about said direction, the plane mirrors reflecting onto the concave mirrors the light beams which come from the secondary mirror along the two directions that are distinct from the direction of the optical axis of the primary mirror, the concave mirrors reflecting the beams they receive so as to focus them on the acquisition means;

- the tertiary reflection means comprise two concave mirrors which are disposed symmetrically on either side of the direction of the optical axis of the primary mirror and which reflect the light beams which arrive from the secondary mirror along the two directions distinct from the direction of the optical axis of the primary mirror, together with a plane mirror which is common to both paths and which is centered on the direction of the optical axis, extending perpendicularly to said direction, said plane mirror reflecting the beams it receives onto the acquisition means situated on a focal plane common to both paths;

- the primary mirror includes a central hole through which the secondary mirror reflects light; and

- the secondary mirror focuses two intermediate images at the level of the primary mirror, with the two light beams they reflect corresponding to the two observed directions of incidence.

Other characteristics and advantages of the invention appear further from the following description. This description is purely illustrative and non-limiting. It should be read with reference to the accompanying drawings, in which:

FIG. 3 shows a device constituting a third possible embodiment of the invention; and FIG. 4 is a diagrammatic perspective view of the FIG. 3 device.

Figure 1:
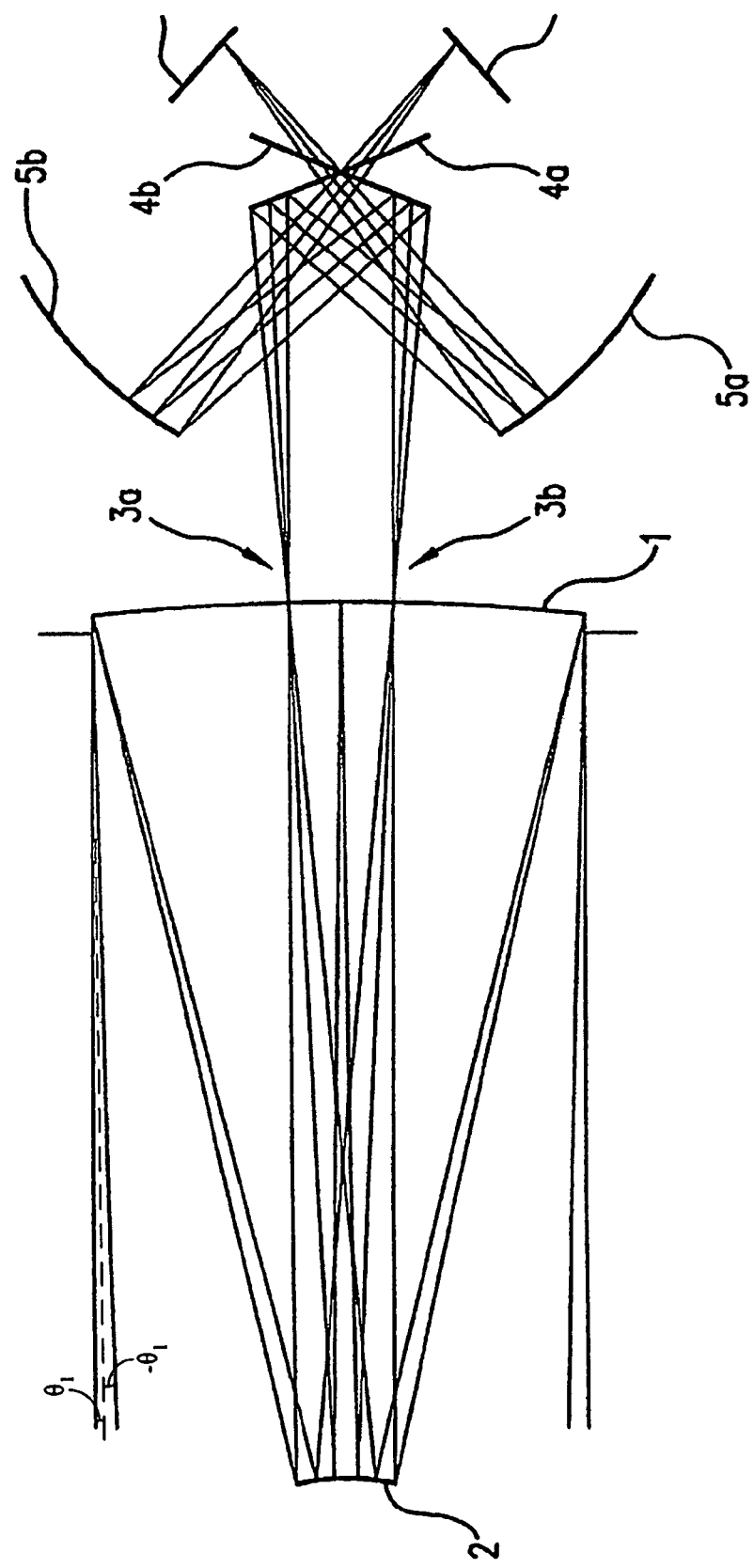
FIG. 1 shows a device constituting one possible embodiment of the invention.

The device shown in FIG. 1 comprises a primary mirror 1 of conical shape close to that of a parabola, together with a convex mirror 2 which is placed on the optical axis of said primary mirror 1 and which intercepts the beams reflected by said parabolic mirror 1 before they reach its focus.

The primary mirror 1 is pieced by a central hole passing intermediate images 3a and 3b which are disposed symmetrically on either side of its center.

The primary and secondary mirrors 1 and 2 are dimensioned in such a manner that the beams which are incident on said primary mirror 1 with respective angles $\theta 1$ and $-\theta 1$ relative to the optical axis of said primary mirror 1 are focused respectively on the central hole.

The device also has two plane mirrors 4a, 4b which are disposed symmetrically about the optical axis of the primary mirror 1, being situated on the side of said primary mirror 1 that is opposite from the side where the secondary mirror 2 is situated.

The two plane mirrors 4a and 4b lie respectively on the paths of the beams which, after being reflected by the convex mirror 2, pass through the mirror 1 via the intermediate images 3a and 3b.

These plane mirrors 4a and 4b reflect the beams they receive from the images 3a and 3b onto two concave mirrors 5a and 5b which are conical and which reflect the beams they receive onto two focus planes 6a and 6b where charge coupled detector strips or matrices are located, for example.

As will have been understood, such a device makes it possible in simple manner to acquire two images which correspond to the same scene as viewed at two different angles of incidence.

Numerous variants of the embodiment shown in FIG. 1 can be envisaged.

In particular, depending on the shape and the dimensions of the volume in which the rear portion of the telescope is to be housed, it is naturally possible to act on the orientations of the plane mirrors 4a and 4b and on the orientations of the concave mirrors 5a and 5b.

Figure 2:
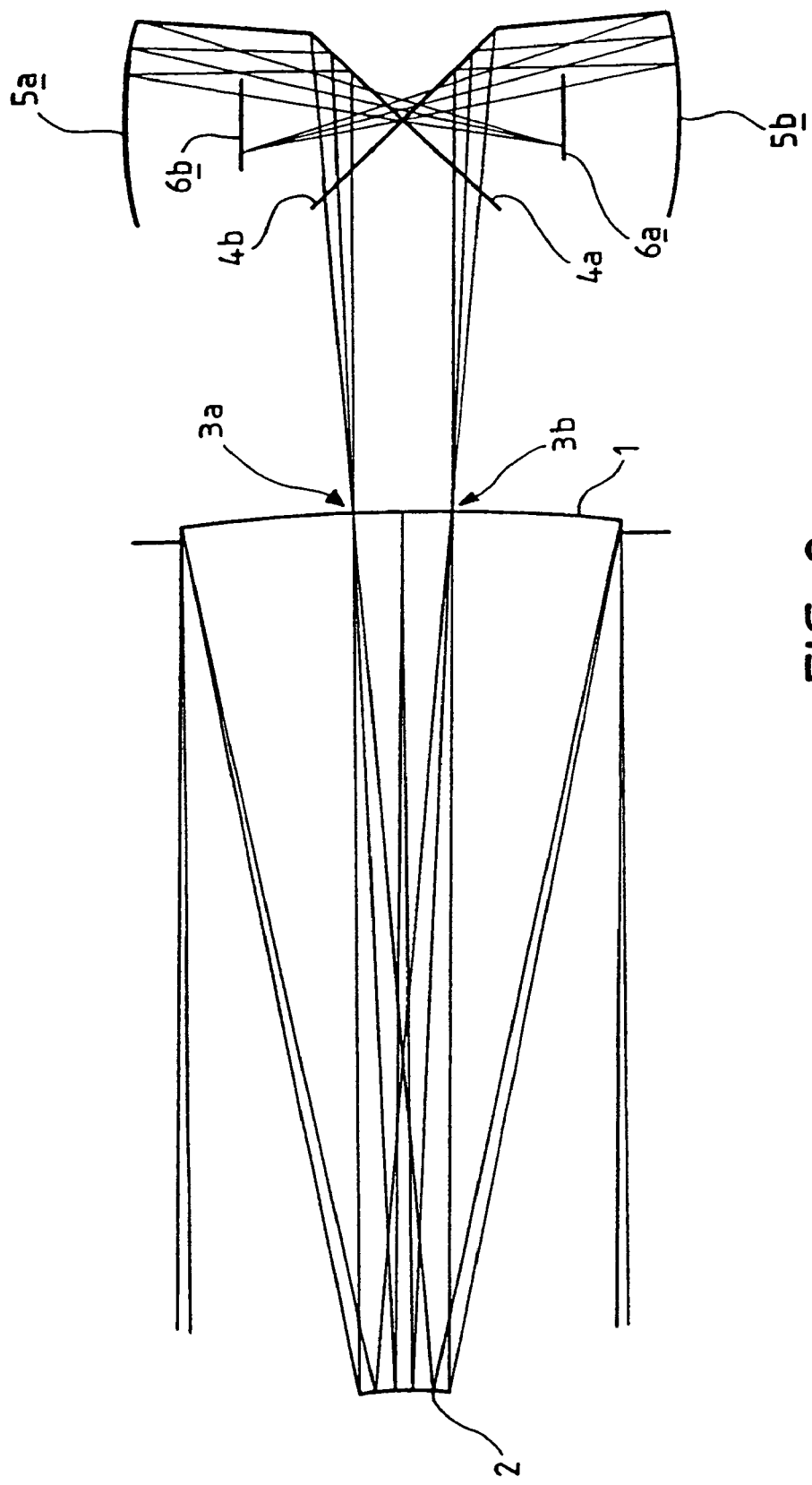
FIG. 2 shows a device constituting another possible embodiment of the invention.

Thus, FIG. 2 shows a situation in which the focus planes 6a and 6b are parallel to the optical axis of the primary mirror 1 and are interposed between said optical axis and the concave mirrors 5a and 5b.

In another variant, as shown in FIGS. 3 and 4, the beams coming out from the central hole and serving to pass the intermediate images 3a and 3b can be reflected by conical concave mirrors 7a and 7b placed symmetrically on either side of the axis of the primary mirror 1. These concave mirrors 7a and 7b focus the beams they receive by reflecting them onto a plane mirror 8 that is common to both reflection paths. This plane mirror 8 is centered on the direction of the optical axis of the primary mirror 1 and is perpendicular to said direction. It reflects the beams onto a focus plane 9 that is common to both paths.

A strip or a matrix of charge coupled devices that is common to both paths can be situated in the focus plane 9, for example.

A device of the types described above is advantageously used on board a satellite orbiting the earth, so as to observe the same scene at two different instants, and thus with different aiming directions.

By way of example, these aiming directions can be angularly separated by an angle lying in the range 2° to 10°.

The device proposed by the invention enables the satellite to acquire images in those two aiming directions, i.e. without any need to alter the attitude of the satellite or the direction in which the observation device points relative to the satellite.

The invention claimed is:

1. An observation device for acquiring two images corresponding to a scene viewed from two different aiming directions, comprising:

a primary mirror that is parabolic or nearly parabolic for receiving light beams of an object to be observed along two respective angles of incidence $\theta_1$ and $-\theta_1$ relative to an optical axis of the primary mirror, the primary mirror having a focus, a secondary reflection means situated between said primary mirror and said focus, said secondary reflection means reflecting light beams received from said primary mirror, said primary mirror being suitable for passing light reflected by said secondary reflection means so as to enable said light reflected by said secondary reflection means to reach a plurality of tertiary reflection means symetrically disposed about said optical axis of said primary mirror and on a side of said primary mirror opposite from a side of the primary mirror on which said secondary reflection means is disposed, and image acquisition means for receiving light reflected by said plurality of tertiary reflection means, characterized in that said secondary reflection means comprises a mirror situated on said optical axis of said primary mirror, said primary mirror and said secondary reflection means being dimensioned in such a manner that the light beams which are incident on said primary mirror with said two respective angles $\theta_1$ and $-\theta_1$ are reflected respectively on said plurality of tertiary reflection means for focusing incident light beams onto said image acquisition means, wherein said plurality of tertiary reflection means comprise two plane mirrors placed symetrically on either side of said optical axis of said primary mirror, together with two corresponding concave mirrors also disposed symetrically about said optical axis, said plane mirrors reflect respectively onto associated concave mirrors light beams which come from said secondary mirror and corresponding to said respective angles of incidence $\theta_1$ and $-\theta_1$, said concave mirrors reflecting said light beams they receive so that said light beams are focused on said image acquisition means.

2. An observation device for acquiring two images corresponding to a scene viewed from two different aiming directions, comprising:

a primary mirror that is parabolic or nearly parabolic for receiving light beams of an object to be observed along two respective angles of incidence $\theta_1$ and $-\theta_1$ relative to an optical axis of the primary mirror, the primary mirror having a focus, a secondary reflection means situated between said primary mirror and said focus, said secondary reflection means reflecting light beams received from said primary mirror, said primary mirror being suitable for passing light reflected by said secondary reflection means so as to enable said light reflected by said secondary reflection means to reach a plurality of tertiary reflection means symetrically disposed about said optical axis of said primary mirror and on a side of said primary mirror opposite from a side of the primary mirror on which said secondary reflection means is disposed, and image acquisition means for receiving light reflected by said plurality of tertiary reflection means, characterized in that said secondary reflection means comprises a mirror situated on said optical axis of said primary mirror, said primary mirror and said secondary reflection means being dimensioned in such a manner that the light beams which are incident on said primary mirror with said two respective angles $\theta_1$ and $-\theta_1$ are reflected respectively on said plurality of tertiary reflection means for focusing incident light beams onto said image acquisition means, wherein said plurality of tertiary means comprise two concave mirrors which are disposed symetrically on either side of said optical axis of said primary mirror and which reflect respectively the light beams arriving from said secondary mirror and corresponding to said respective angles of incidence $\theta_1$ and $-\theta_1$, together with a plane mirror which is common to both paths and which is centered on said optical axis, extending perpendicular to said optical axis, said plane mirror reflecting the light beams it receives onto said image acquisition means situated on a focal plane common to both paths.

3. A device according to any preceding claim, characterized in that said primary mirror includes a central hole through which said secondary mirror reflects light.

4. A device according to claim 3, characterized in that said secondary mirror forms two intermediate images at a central opening of said primary mirror, with the light beams they reflect corresponding respectively to said two respective angles of incidence $\theta_1$ and $-\theta_1$.

5. A device according to any one of claim 1 or 2, characterized in that said secondary mirror forms two intermediate images at a central opening of said primary mirror, with the light beams they reflect corresponding respectively to said two respective angles of incidence $\theta_1$ and $-\theta_1$.

* * * * *